United States Patent [19]

Konishi et al.

[11] 4,310,231
[45] Jan. 12, 1982

[54] CLOSE-UP COPY PHOTOGRAPHY APPARATUS

[75] Inventors: Yuichiro Konishi, Tokyo; Nozomu Kitagishi; Akiyasu Sumi, both of Kawasaki, all of Japan

[73] Assignee: Canon Kabushiki Kaisha, Tokyo, Japan

[21] Appl. No.: 196,440

[22] Filed: Oct. 14, 1979

Related U.S. Application Data

[63] Continuation of Ser. No. 22,332, Mar. 20, 1979, abandoned.

[30] Foreign Application Priority Data

Mar. 27, 1978 [JP] Japan .................................. 53-39257

[51] Int. Cl.³ ...................... G03B 3/00; G03B 15/02; G03B 17/48; G03B 7/18
[52] U.S. Cl. ...................................... 354/79; 354/80; 354/126; 354/197; 354/295; 354/293; 355/21; 355/39; 355/63; 355/75
[58] Field of Search ................... 354/79, 80, 109, 197, 354/286, 292, 293, 295, 126; 350/38, 39, 18, 19, 81, 86, 90, 91, 235, 40, 423, 237; 355/63, 75, 21, 39, 45, 55, 67

[56] References Cited

U.S. PATENT DOCUMENTS

| 3,622,239 | 11/1971 | Miller | 355/39 |
| 3,689,148 | 9/1972 | Black | 355/39 X |
| 3,893,138 | 7/1975 | Frode | 354/286 |
| 4,030,113 | 6/1977 | Obreschkow | 354/286 |

FOREIGN PATENT DOCUMENTS

| 1005831 | 4/1957 | Fed. Rep. of Germany | 354/197 |
| 1348620 | 12/1964 | France | 355/39 |

Primary Examiner—L. T. Hix
Assistant Examiner—William B. Perkey
Attorney, Agent, or Firm—Toren, McGeady & Stanger

[57] ABSTRACT

A system for close-up and copy photography is so designed that a zoom lens whose total barrel length remains unchanged during zooming operation is attached to a camera as the master lens with an adapter being attached to the zoom lens and with a fixed focus lens being attached to the adapter on the side opposite the side to which the zoom lens is attached. The fixed focus lens is arranged in a position reversed from the position in which it would normally be used, that is, with its object side facing the zoom lens and with its image side facing toward an object to be photographed. The adapter may have a filter mount mechanism and a securing stand attached to the adapter for holding an object to be photographed is structured to permit illumination of the object.

3 Claims, 9 Drawing Figures

CLOSE-UP COPY PHOTOGRAPHY APPARATUS

This is a continuation of application Ser. No. 22,332 filed Mar. 20, 1979, now abandoned.

BACKGROUND OF THE INVENTION

The present invention relates generally to photography apparatus and more particularly to an assembly for performing close-up and copy photography of an object.

Until the present time, close-up and copy photography of the type contemplated herein has required the use of a bellows device. Because such a bellows device is normally used in conventional apparatus, it is difficult to achieve an operative association between an exposure control signal from a camera which is utilized with the device, and which is mounted on a side of the bellows device, and a diaphragm device of the photography apparatus located on a side of the bellows device. Because of the shortcomings involved with the utilization of a bellows device it is difficult to effect the desired photography operations with automatic exposure control such as automatic control of the aperture of the lens by means of an exposure control signal from the camera. Furthermore, in apparatus utilizing a bellows device, when the magnification ratio is to be varied, the total length of the photography apparatus including the camera, the bellows and the lens system, must be varied. As a result, the copy stand which supports the photography apparatus must be constructed to be sufficiently rigid to enable the required adjustment. Thus, in order to effect magnification adjustment there will arise troublesome adjusting procedures and the framing and focusing operations can only be effected by incurring significant inconvenience.

In a photography assembly of the type described utilized for close-up or copy photography the camera and the photographing lens are arranged respectively upon opposite sides of the bellows body and the entire apparatus is mounted on a support pole or stanchion of a copy stand with the total length of the photography apparatus being varied depending upon the magnification ratio which must be achieved to produce an adjusted image of the object to be photographed. Thus, in the case of such a bellows device, the overall procedure, including especially the change in magnification ratio, tend to involve troublesome efforts and inefficient operations. A primary purpose of the present invention is to provide a close-up and copy photography system which may be operated more efficiently and with greater ease of operation.

SUMMARY OF THE INVENTION

Briefly, the present invention may be described as a close-up or copy photography system comprising, in combination: a camera which is adapted to have an interchangeable lens mounted thereon; a zoom lens mounted on the camera and having a lens barrel whose length remains unchanged during zooming operation; an adapter capable of being mounted on the zoom lens; a fixed focus lens mounted on the adapter; and a securing stand including means for holding an object to be photographed operatively joined with the fixed focus lens, the securing stand being configured to enable illumination of an object held therein and to permit the camera to photograph the object. The adapter may include means for replaceably mounting a filter device into the system and the securing stand may also be arranged to enable the object to be photographed to be moved toward or away from the camera. Of course, the zoom lens and the fixed focus lense are aligned with coincident optical axes so that the camera may photograph an object held in the securing stand through both the zoom lens and the fixed focus lens as well as through the adapter.

Thus, with the combination of the invention, close-up and copy photography is achieved with greater efficiency and ease by making use of the combination of a conventional zoom lens with an ordinary standard lens. The apparatus of the invention utilizes a zoom lens whose total length remains unchanged during the zooming operation in place of the bellows device thereby enabling the apparatus to be operated without varying the total length of the apparatus during adjustment of the magnification factor.

The zoom lens whose total length remains unchanged during the zooming operation is attached to the camera as a master lens, an adapter is attached to the filter mounting part of the zoom lens and a fixed focus lens is attached to the master lens as an attachment lens by means of the adapter. The entire assembly is secured either by securing the camera body on a camera securing part of the copy stand or the mount part of an attachment lens on the mount plane of the lens mounting part of the copy stand.

An additional advantage of the present invention involves the fact that when the ambient environment is comparatively dark so that ordinary daylight or room light is not sufficient for effecting an adequate exposure, the apparatus may be provided with an illumination device in which a tungsten lamp, required for high sensitivity positive film, may be built into the overall device to avoid the drawbacks where inadequate ambient light is available.

A further purpose of the invention is to offer an adapter and a close-up and copy stand suitable for close-up and copy photography.

For this purpose, a suitable composition of the adapter is provided constituting a tandem optical system with the zoom lens and the other photography lens.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
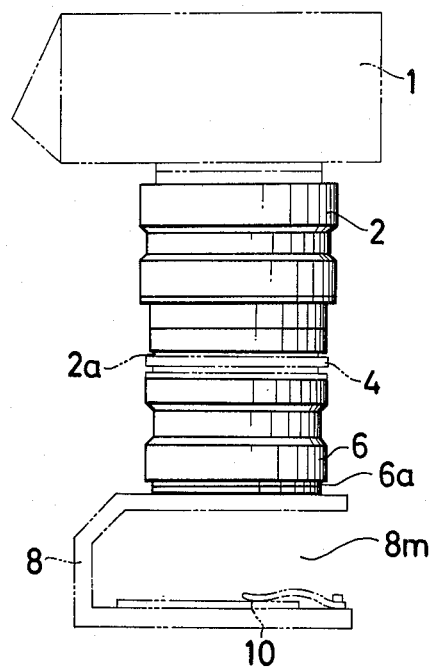
FIG. 1 is a schematic elevation showing a close-up and copy photography system in accordance with the present invention.

FIG. 1 shows in side elevation as assembly embodying the present invention which includes a camera 1, a zoom lens 2 mounted upon the camera 1, an adapter 4 which may be attached to a filter mounting portion 2*a* of the zoom lens 2 and a fixed focus lens 6 mounted on the adapter on the side thereof opposite the side on which the zoom lens 2 is mounted. The adapter 4 is shown in greater detail in FIG. 2 and comprises a threaded portion 4*a* which may enable the zoom lens to be mounted upon the adapter 4 and a threaded portion 4*b* adapted to have attached thereto the fixed focus lens 6. The zoom lens 2 is of the type whose total length remains unchanged during zooming operation and which includes a filter mounting portion 2*a* which may be joined with the threaded lens connecting portion 4*a* of the adapter 4. The fixed focus lens is mounted on the adapter 4 by utilizing the threaded portion 4*b* of the adapter.

The fixed focus lens 6 has a mount side 6*a* which may be connected with the mount member 8*a* of a copy stand 8.

The copy stand 8 is provided with an object holding portion 10 secured on the copy stand.

The magnification factor of the assembly depicted in FIG. 1, which consists of the combination of the camera 1, the zoom lens 2, the adapter 4 and the lens 6 mounted upon the copy stand 8, may be explained by reference to FIG. 3.

The optical system in accordance with the present invention involves a tandem optical system whereby the free ends of the two photography lenses are combined in such a manner that they are opposed to each other.

Satisfactory results can be obtained in the case where both lenses are so designed that their aberration is compensated at the infinite distance or when the picture is taken at the reduced scale.

Figure 3:
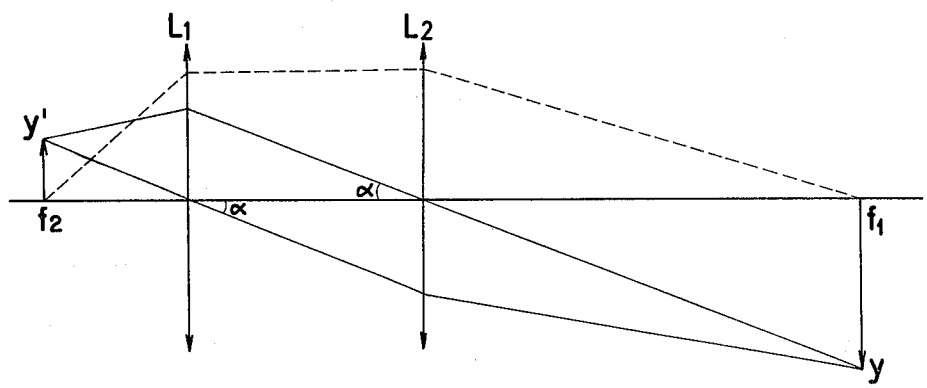
FIG. 3 is a graphical illustration depicting the method for adjusting the magnification factor of an optical system utilized in the apparatus of the invention.

Referring now to FIG. 3, $L_1$ represents the photographing lens of the zoom lens 2 and $f_1$ represents its focal length. $L_2$ is the fixed focus lens 6 and $f_2$ represents its focal length.

In the case of the present invention, an object to be photographed is positioned approximately at $f_1$ with the imaging point being positioned at or close to $f_2$. If it is assumed that the dimension of the object is $y_1$, and that the image dimension is $y'$ then from FIG. 3, the following formulas will apply.

$$y = f_1 \tan \alpha \quad (1)$$

$$y' = f_2 \tan \alpha \quad (2)$$

Consequently, the magnification factor X of this optical system may be obtained from the following relationship:

$$x = (y'/y) = (f_2/f_1) \quad (3)$$

Accordingly, the magnification factor may be easily adjusted by making either of the lenses $L_1$ or $L_2$ variable. That is, the magnification factor of the photography apparatus of the present invention, wherein the ends of the zoom lens 2 and of the photography lens 6 are arranged so as to be opposed to each other, can be represented by means of the ratio of the focal lengths of both lenses whereby the magnification can be adjusted by operating the zoom lens 2.

Thus, in the case of the present invention, a fixed focus lens is connected to the optical system of the camera or of the photography apparatus which is equipped with a zoom lens and the object to be photographed is placed at or near one of the conjugate points of the fixed focus lens in order to effect close-up and copy photography.

Figure 2:
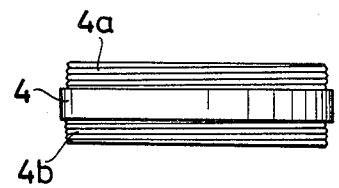
FIG. 2 is a side view of an adapter which may be utilized with the apparatus of the invention.

In a situation where the embodiment depicted to FIG. 1 and 2 is to be used for close-up photography involving automatic exposure control by means of an automatic exposure control camera with the zoom lens, the diaphragm of the fixed focus lens 6 is totally open and the exposure time information or the aperture value information, set by means of the camera or the zoom lens 2, is set to an optional exposure value so as to set the exposure factor for the automatic exposure control photography.

Then, the magnification factor can be optionally adjusted by means of adjustment of the ratio of the focal length of the zoom lens 2 to that of the lens 6.

Let it, for example, be supposed that the focal length of the zoom lens 2 is variable between 50 and 300 mm while that of the fixed focus lens 6 is 50 mm.

The magnification factor may be adjusted from between 1 to 6 by means of the zooming operation.

In the case of manual control photography, the exposure value setting means (not shown) may be manually operated in the same way as in the case of ordinary manual photography. In this context, an opening 8 m is provided in a portion of the copy stand 8 in order to obtain light for illuminating the object from the exterior of the apparatus.

As mentioned above, in the case of automatic exposure control of the camera combined with the zoom lens, the diaphragm of the lens 6 serves as a device for controlling the amount of light incident upon the view finder of the camera 1 in case the light reflected from the object is too strong or too weak in order thereby to facilitate focusing or framing operation.

Figure 4B:
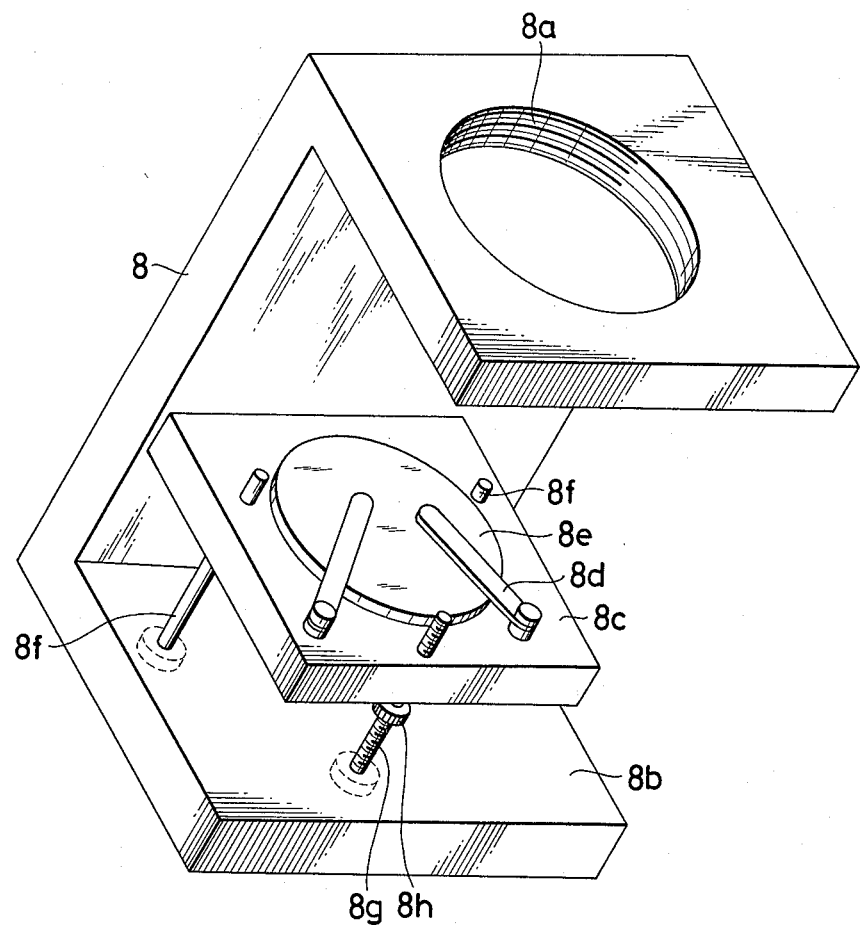
FIG. 4(b) is a perspective view of a copy stand which may be utilized with the invention.
Figure 4A:
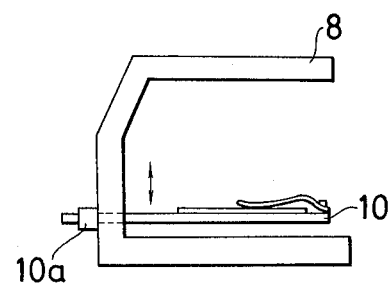
FIG. 4(a) is a side view of a copy stand utilized with the apparatus of the present invention.

FIG. 4*a* shows another embodiment of the object holding portion 10 of the copy stand 8 whereby the holding portion 10 is movable upwardly and downwardly in the direction of the arrow shown in FIG. 4*a* with the object holding portion 10 being secured at a desired position by means of a securing member 10*a*. Accordingly, focusing and light adjustment may be relatively easily effected.

A fixing stand for close-up and copy photography may also be composed in the manner shown in FIG. 4(*b*) wherein a fixing stand 8 having connecting means 8*a* for mounting upon the stand 8 the fixed focus lens 6. The stand 8 is provided with a base 8*b* and an object holding portion 8*c*, wherein the object to be photographed may be held by means of a clamping member 8*d* which may comprise a spring or the like. An object holding plate 8*e* is arranged on the opening (not shown) in the object holding member 8*c* whereby the object may be illuminated by means of incident light or reflected light. The object holding member 8*c* may be moved to vary the distance between the fixed focus lens 6 and the object. Such adjustment may be provided by means of a fine adjusting device which consists of guide members 8f, 8f and a screw 8a having a nut 8h operatively engaged therewith, the screw 8b extending from the base part 8b and penetrating into the object holding member 8c. Although a screw mount type of connecting means is depicted in FIG. 4b for the fixing stand, it would be understood that a bayonet-type mount may also be provided.

Figure 5:
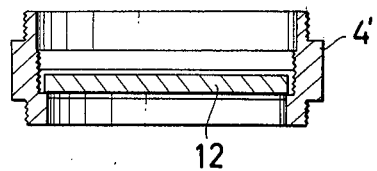
FIG. 5 is a partially sectioned view showing an adapter capable of having a filter mounted therein.
Figures 6A, 6B:
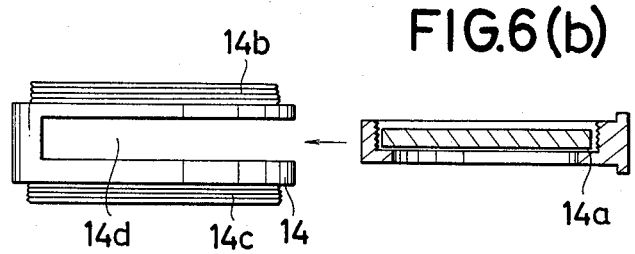
FIGS. 6(*a*) and 6(*b*) are, respectively, sectional views of a further embodiment of an adapter body and a filter holding part which may be utilized therewith.

FIG. 5 shows an adapter 4' of the type depicted in FIG. 2 having a filter 12 mounted therein. FIGS. 6(a) and 6(b) also show a further embodiment of an adapter having a filter member mounted therein. In FIGS. 6(a–b) an adapter body or frame 14 is formed with a filter mounting part 14d wherein a filter such as the filter 12 can be mounted and dismounted with the adapter being located in a position to effect close-up and copy photography in apparatus such as that shown in FIG. 1. The frame 14 will hold the filter and with the adapter mounted in operative engagement within an assembly such as that depicted in FIG. 1, the adapter frame 14 may or may not have the filter mounted therein. The adapter shown in FIGS. 6(a–b) consists of the adapter body 14 and a filter holding part 14(a), with the adapter body being provided with a mount part 14b which comprises a threaded connection for the zoom lens and with a mount part 14c which is also threaded to enable the standard lens to be mounted thereon. The filter holding part 14a may be removably mounted within the mounting part 14d as indicated in the drawings.

Figure 7:
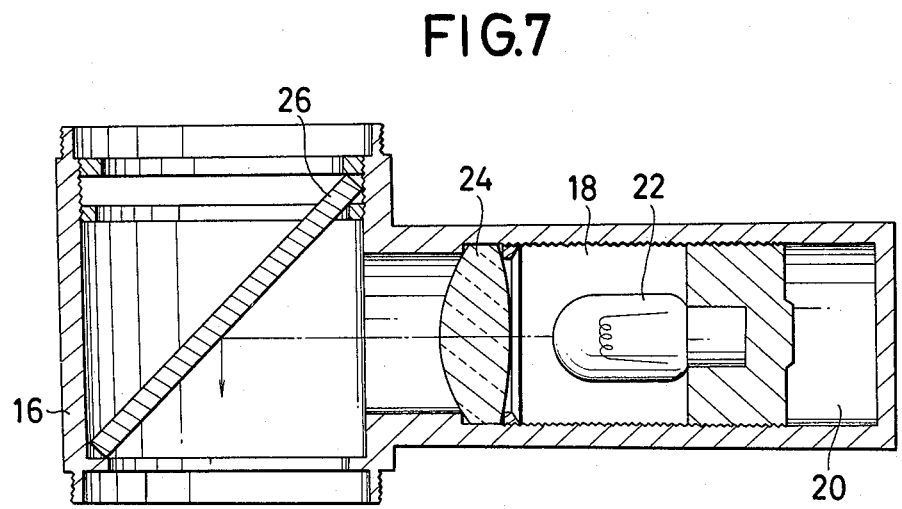
FIG. 7 is a sectional view of an adapter having an illumination mechanism.

FIG. 7 shows an embodiment of the invention wherein an illumination apparatus 18 is provided in an adapter such as the adapter 16 in order to be formed as a single unitary body, the illumination apparatus consisting of a power source 20, a lamp 22 and a condenser lens 24 wherein light from the illuminating device will be reflected by means of a half mirror 26 held within the adapter 16 to be directed toward an object to be photographed in order to provide proper illumination for the object.

As previously explained herein, in accordance with the present invention a practical apparatus for performing close-up and copy photography may be obtained by means of a comparatively simple composition whereby at the time of adjustment of the magnification it is particularly advantageous that the overall length of the device need not be changed thereby enabling a rather convenient mode of operation.

Furthermore, the adapter of the invention may be provided with an illumination apparatus so that the servicability of the photography apparatus is greatly improved. Furthermore, with regard to the adapter, the zoom lens and the fixed focus lens may be interchangeably connected therewith while the magnification factor is capable of being freely adjusted. Thus, the close-up and copy system of the present invention may also be operated with various zoom lenses since the zoom lens itself may be optionally exchanged for another zoom lens.

While specific embodiments of the invention have been shown and described in detail to illustrate the application of the inventive principles, it will be understood that the invention may be embodied otherwise without departing from such principles.

What is claimed is:

1. A photographic assembly for performing close-up and copy photography comprising, in combination:

a camera adapted to have a zoom lens exchangeably mounted thereon in operative relationship therewith;

a zoom lens mounted at one end thereof on said camera, said zoom lens including a lens barrel and being structured to perform zooming operations with the overall length of said lens barrel remaining unchanged, said zoom lens having a mechanism associated with an automatic exposure control mechanism of said camera for automatically controlling the exposure;

an adapter member having connecting means at opposite ends thereof for attachment of lenses thereto, said adapter member being connected to said zoom lens at an end of said zoom lens opposite said one end mounted to said camera;

a fixed focal length lens having an image side and an object side, said lens being attached to said adapter member at an end of said adapter member opposite the end at which said zoom lens is attached, with said object side of said fixed focal length lens facing toward said zoom lens; and a fixed base member including means for holding an object to be photographed and configured to enable illumination of an object held therein and to permit said camera to photograph said object, said base member including means connecting said base member with said fixed focal length lens in operative relationship with said photographic assembly with said image side facing toward said means for holding an object to be photographed to enable operation of said assembly to photograph an object mounted in said base member, with the length in the optical direction of said assembly being maintained constant by operation of the combination of said camera, said zoom lens, said adapter member, said fixed focal length lens and said base member.

2. A photographic assembly according to claim 1 wherein said adapter member includes illuminating means for emitting illuminating light in the optical axial direction of said assembly.

3. A system according to claim 1 wherein said adapter includes a filter for controlling the amount of light illuminating said object and means for mounting and dismounting said filter.

* * * * *